3,240,768
COPOLYMERS OF ALPHA OLEFIN AND RE-
ACTIVE OMEGA ALKENYL SILANES
Karl R. Guenther, Colonia, N.J., assignor to Esso
Research and Engineering Company, a corporation
of Delaware
No Drawing. Filed June 9, 1961, Ser. No. 115,911
6 Claims. (Cl. 260—88.1)

The present invention relates to improved polymers formed by the polymerization of alpha olefins. More particularly, it deals with copolymerizing alpha olefins with specific reactive omega alkenyl silanes in order to improve the properties of olefin polymers.

In recent years there has been increasing interest in the polymerization of various alpha olefins under mild conditions of temperature and pressure. The preparation of such polymers using catalyst systems made up of a reducible heavy transition metal compound and a reducing metal-containing compound is well known in the art (see "Chemical and Engineering News," April 8, 1957, page 12; "Petroleum Refiner," September 1956, page 191, etc.).

Among the difficulties encountered in employing the resulting olefin polymers, such as polypropylene, for various uses has been their tendency to undergo degradation during conventional processing procedures, such as extrusion. Additionally, some alpha olefin polymers have been of quite limited utility due to their amorphous and non-curable nature.

There thus exists a need for means of improving the processing properties of alpha olefin polymers as well as securing polymers of greater practical utility. In accordance with the present invention, the properties of alpha olefin polymers produced by low pressure techniques, as described above, are greatly improved by copolymerizing the alpha olefin with particular reactive omega alkenyl silanes. More specifically, 99.99 to 20, preferably 99.9 to 65, wt. percent of alpha olefin is copolymerized with about 0.01 to 80, preferably 0.1 to 35, wt. percent of an omega alkenyl silicon compound containing at least one reactive function on the silicon atom selected from the group consisting of hydrogen and halogen. Particularly preferred are copolymers of 80 to 99.99 wt. percent alpha olefin and 20 to 0.01 wt. percent reactive omega alkenyl silane. Generally the resulting polymers have a molecular weight of 50,000 to 1,000,000 based on the Kinzinger method (thesis, University of Pennsylvania, 1957), and are 60 to 95% crystalline as measured by heptane solubility. The resulting copolymers exhibit greatly improved processing stability as is indicated by a constant Melt Index for prolonged periods.

The hydrocarbon alpha olefins suitable as components of the present polymers are straight or branch chain aliphatic mono-alpha olefins having from 2 to 15 carbon atoms. Examples thereof are: ethylene, propylene, butene-1, pentene-1, 3-methyl butene-1, 4-methyl pentene-1, hexene-1, 4,4-dimethyl pentene-1 and 4-methyl hexene-1. If desired, mixtures of alpha olefins can be utilized in the feed to the present polymerization step, the resulting polymer thus being formed from a three or more component monomer system. An example of such a polymer would be that formed by polymerizing ethylene, propylene, and the present reactive omega alkenyl silanes.

The reactive omega alkenyl silanes suitable for the practice of the present invention are either omega alkenyl halosilanes, or unsubstituted omega alkenyl silanes (silanes containing at least one hydrogen attached directly to the silicone atom). Copolymerization of alpha olefins with alkyl or alkoxy substituted omega alkenyl silanes such as allyl trimethyl silane, diallyl dimethyl silane, or vinyl silanes such as vinyl trimethyl silane and vinyl triethoxy silane, fail to give the marked improvement in processing stability offered by the practice of the present invention.

The omega alkenyl halosilanes and unsubstituted omega alkenyl silanes employed in the practice of the present invention have the following generic formula

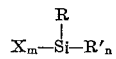

wherein: (1) R is a $C_3$ to $C_{10}$, preferably $C_3$ to $C_6$, aliphatic olefin having a double bond omega to the silicon atom and whose double bonded carbon atoms are free of substitution; (2) R' is a $C_1$ to $C_{50}$, preferably $C_1$ to $C_{10}$, alkyl, aryl or aralkyl; (3) X is selected from the group consisting of halogen and hydrogen atoms; (4) $m$ is an integer of at least 1; (5) $n$ is an integer from 0 to 2 such that the sum of $m$ and $n$ is 3.

Examples of compounds falling within the above generic formula are the following:

(1) *Omega alkenyl halosilanes.*—Allyl trichlorosilane, allyl tribromo-silane, diallyl dichlorosliane, diallyl dibromosilane, allyl trifluorosilane, omega butenyl trichlorosilane, diallyl difluorosilane, omega pentenyl trichlorosilane, triallyl chlorosilane, omega hexenyl trichlorosilane, allyl triodosilane, allyl dimethyl chlorosilane, diallyl diiodo silane, triallyl bromosilane.

(2) *Unsubstituted omega alkenyl silanes.*—Diallyl silane, triallyl silane, allyl silane, omega butenyl silane, omega pentenyl silane, omega hexenyl silane, di-omega butenyl silane, tri-omega butenyl silane, di-omega pentenyl silane.

Mixtures of reactive silanes falling within the above generic formula may be advantageously used in the feed to the present polymerization process.

The polymerization of the above monomers to form the novel polymers of the present invention is carried out at relatively mild temperature and pressure conditions. Thus polymerization may be effected at a temperature in the range of 0° to 150° C., preferably 20° to 80° C., and at a pressure of about 0 to 10 atmospheres. Atmospheric conditions may readily be employed. Reaction times of 0.25 to 10, preferably 0.5 to 3, hours are usually utilized. Polymerization is carried out in a wide variety of hydrocarbon diluents such as aliphatic or aromatic hydrocarbons. Examples thereof are n-heptane, n-hexane, isopentane, cyclopentane, benzene, dichlorobenzene, xylene, etc.

After polymerization, the polymer may be isolated by use of an antisolvent, such as $C_1$ to $C_5$ aliphatic alcohol, or a ketone, e.g., acetone. Additionally, small quantities of chelating agents, such as diketones, may be added to the solution in order to expedite separation of catalyst contaminants from the polymer. Alternatively, the polymer may be recovered by steam stripping off the diluent after quenching the reaction with alcohol or water. The recovered polymer is then normally filtered and dried, and thereafter processed by conventional polymer processing techniques, e.g., extrusion, molding, dicing, etc.

The catalysts employed in the present polymerization process have heretofore been utilized for low pressure homo polymerization of alpha olefins, i.e., a mixture of a reducible heavy transition metal compound and a reducing metal-containing compound. The catalyst can be prepared by mixing from about 0.2 to 12 parts of reducing metal compound with each part of reducible heavy transition metal compound, preferably in an inert diluent. Reducing metal-containing materials used as a catalyst component include compounds of Group I to III metals such as the alkali and alkaline earth metals, their alloys, and their alkyl and/or aryl compounds such as lithium alkyls, zinc alkyls and magnesium alkyls. Particularly preferred are organoaluminum compounds, especially trialkyl aluminum compounds or dialkyl aluminum halides. Examples of such compounds are triisobutyl aluminum, triisopropyl aluminum, triethyl aluminum, diethyl aluminum chloride, diisobutyl aluminum bromide, etc.

Reducible heavy metal compounds employed as the catalyst component include the halides, oxyhalides, complex halides, oxides, hydroxides, etc. of transition metals of Group IV to VIII of the Periodic System, e.g., titanium, zirconium, vanadium, chromium, molybdenum, tungsten and manganese. The metal halides, particularly the chlorides, of the first three metals noted above, and especially titanium tetrachloride, are preferred.

An especially desirable catalyst for the practice of the present invention is formed by the systems more fully described in S.N. 766,376, now U.S. Patent 3,032,513, and S.N. 770.128, and now abandoned, filed October 10, 1958, and October 28, 1958, respectively. In such a system, the catalyst is prepared by the partial reduction of a Group IV-B to V-B or VI-B heavy metal halide, such as titanium tetrachloride, with aluminum powder in substantially aromatic hydrocarbon diluents at low temperatures and pressures to form a metal halide, e.g., titanium chloride cocrystallized with aluminum halide, e.g., aluminum chloride. This catalyst component is then further activated with the above-noted organometallic reducing compounds.

In general, catalyst concentrations of 0.1 to 20, preferably 0.5 to 3, grams per liter are employed in the polymerization zone with the mole ratio of activating organic metallic compound to reducible transition metal halide ranging from 0.1 to 5.

The novel polymers of the present invention can be utilized in various conventional applications, such as housewares, pipes, plastic hose, etc. They may be admixed with various material such as pigments, fillers, fibers and curatives.

The various aspects and modifications of the present invention will be made more clearly apparent by reference to the following description and accompanying examples.

Unless indicated otherwise, all molecular weights are based on the Kinzinger method.

The extended melt index values in the examples were determined in the following manner.

The melt index is carried out at 300° C. with an F. J. Slocumb extrusion plastometer as described in ASTM Procedure D-1238-57T for extended periods using an 0.050" diameter orifice and a 2.16 kg. weight. Extrudate samples are taken at 6'-9', 15'-18', 21'-24' and 27'-30' with the weight being removed except during and just before 30' sampling. Data reported are the initial value (9') and the ratio of the final cut to the initial (30'/9'). A low value is desired for both numbers. The initial value is a function largely of the melt index of the resin. Thus a high initial value can indicate very poor processing stability or, more generally, extreme sensitivity to small amounts of oxidation during milling (and molding).

The higher the ratio, the greater the molecular weight breakdown during the test, but the ratio is a function of the initial value. Thus both numbers are reported. If insufficient sample is available for all cuts, the ratio is indicated as greater than the ratio for the last sample.

EXAMPLES 1 AND 2

Polymers containing omega alkenyl halosilanes were prepared by low pressure polymerization techniques and compared with polypropylene formed in the same manner.

In each of the three polymerization processes, the catalyst was prepared by first reacting 190 grams of titanium tetrachloride with 27 grams of aluminum in benzene diluent at a temperature of 135° C. to obtain a product of cocrystallized titanium chloride and aluminum chloride. The cocrystallized titanium halide was then activated by the addition of 2 moles of aluminum triethyl per mole of titanium chloride cocrystallized with aluminum chloride. Polymerization took place in the presence of 870 grams of xylene diluent at 80° C. and atmospheric pressure using an excess of propylene and a total catalyst concentration of 1 gram/liter of diluent.

In Run 1, propylene was polymerized alone under the above conditions to give polypropylene of 400,000 molecular weight. In Run 2, about 0.4 wt. percent of allyl trichloro silane was added to the diluent prior to the polymerization step. The resulting polymer contained 99.5 wt. percent propylene and 0.5 wt. percent allyl trichloro silane and had a molecular weight of 400,000 (Kinzinger method).

In Run 3, a mixture of allyl chloro silanes obtained from the reaction of allyl chloride and silicon was employed as the monomer feed together with propylene. The mixture contained allyl trichlorosilane, diallyl dichlorosilane and allyl dichlorosilane. The mixed silanes were prepared by the reaction of allyl chloride with a copper-silicon alloy. This reaction is reported in J.A.C.S., 68, 1813 (1945).

Approximately 3 grams of mixed allyl halosilanes were added per liter of reaction mixture. The resulting polymer contained about 99.5 wt. percent propylene and 0.5 wt. percent mixed allyl halosilanes and had a molecular weight of 400,000.

The above illustrates that alpha olefins can be copolymerized with omega alkenyl halosilanes such as allyl halosilanes.

The resulting polymers of Runs 1, 2, and 3 were then evaluated for process stability at 300° C. by the extended melt index test. The extended melt index is a measure of the degree of degradation of the polymer which would be encountered during extrusion, molding, etc. The results of these comparative tests are indicated in Table I.

Table I

[Extended melt index at 300° C.]

| Run | 1 | 2 | 3 |
|---|---|---|---|
| | Alpha Olefin Comonomer Silane | | |
| Interval (Min.) | None | Allyl Trichloro | Mixed Allyl Chloro |
| 6-9 | 5.8 | 1.5 | 0.6 |
| 9-12 | 9.0 | 1.2 | 0.8 |
| 12-15 | 9.9 | 1.0 | 1.5 |
| 15-18 | 14.3 | 0.9 | 0.3 |
| 18-21 | 19.5 | 0.8 | 0.3 |
| 21-24 | 20.9 | 0.8 | 2.9 |
| 24-27 | 21.5 | 0.9 | 2.9 |
| 27-30 | 25.0 | 1.0 | 1.4 |

As shown in Table I, alpha olefin polymers formed by the incorporation of omega alkenyl halosilanes, such as allyl halosilanes, in the monomeric feed have relatively constant melt index with time as compared with conventional low pressure polypropylene, thus indicating the superior processing stability of the polymers of the present invention.

EXAMPLE 3

900 milliliters of xylene were saturated with propylene at 60° C. In one series of runs, the quantity of allyl trichlorosilane indicated in Table II was also incorporated in the feed. In another run, a minor quantity of an alkyl substituted silane, i.e., allyl trimethyl silane, was copolymerized with the polypropylene. The desired amount of silane was added in 50 ml. of xylene followed by 0.47 gram of titanium trichloride·0.33 aluminum trichloride (prepared by the reduction of titanium tetrachloride with aluminum powder in benzene diluent) and 4.7 ml. of a one molar solution of aluminum triethyl in 50 ml. of xylene. The temperature was then raised to 80° C. and the polymerization allowed to proceed for one hour with continuous propylene feed.

Thereafter the polymers were recovered by precipitating with one liter of methanol, washing twice with methanol and drying in vacuo. The polymers were then evaluated by extended melt index at 250° C.

*Table II*

|  | Allyl Trimethyl Silane | Allyl Trichloro Silane |
|---|---|---|
| Silane Concentration, Millimoles/Liter | 31 | 35 |
| Polymerization Rate, w./hr./w | 46 | 73 |
| Percent Silane in Polymer, gms. added/100 gms. of Polymer Removed | 7.8 | 8.3 |
| Molecular Weight | 410,000 | 370,000 |
| Polymer Melt Index at 250° C. (3 minutes) | 22.4 | 0.70 |

As shown in Table II, for equivalent silicon inclusion, the molding of the pellet for melt index determination provided seriously excessive molecular weight degradation as to the trimethyl silane-modified polymer as compared with the practice of the present invention. This is illustrated by the much higher melt index for the same molecular weight.

EXAMPLE 4

Propylene was copolymerized with various silanes in accordance with the methods indicated previously. Polymers having a molecular weight of 400,000 and containing about 0.5 wt. percent silane were compared as to processing stability. Results are shown in Table III.

*Table III*

| Silane Monomer | Initial Molecular Weight | Molecular Weight After 30 Min. at 300° C. | Percent Retained |
|---|---|---|---|
| Allyl Trichlorosilane | 345,000 | 216,000 | 62.6 |
| Diallyl Dimethyl Silane | 450,000 | 184,000 | 40.8 |

As shown in Table III, alkyl substituted omega alkenyl silanes, such as diallyl dimethylsilane, fail to produce the greatly improved processing stability offered by the use of the reactive omega alkenyl silanes of the present invention.

EXAMPLE 5

Example 3 was repeated with the exception that the quantity of allyl trichlorosilane was varied as shown in Table IV, the resulting copolymers having the properties indicated.

*Table IV*

|  | Allyl Trichlorosilane | |
|---|---|---|
| Silane Concentration, Millimoles/Liter | 21 | 7 |
| Polymerization Rate, w./hr./w | 90 | 95 |
| Percent Silane in Polymer, gms. added/100 gms. of Polymer Removed | 4.1 | 1.3 |
| Molecular Weight | 370,000 | 370,000 |
| Polymer Melt Index at 250° C.: | | |
| 6–9 min | 3.5 | 1.03 |
| 9–12 min | 4.0 | 0.63 |
| 12–15 min | 4.3 | 0.51 |
| 15–18 min | 4.2 | 0.66 |
| 18–21 min | 4.1 | 1.01 |

As shown in Table IV, copolymers containing varying quantities of omega alkenyl halosilanes had relatively constant and low melt index values.

EXAMPLE 6

To illustrate the use of a nonhalogen-containing unsubstituted omega alkenyl silane as a means of improving the properties of an alpha olefin polymer, the following experiment was undertaken.

Propylene was copolymerized with diallyl silane in the manner described in Example 1. In this case about 0.4 wt. percent diallyl silane was added to 870 grams of xylene diluent prior to polymerization and the resulting polymer contained about 0.5 wt. percent silane. Its melt index was then evaluated.

*Table V*

[Extended melt index at 250° C.]

| Interval (min.): | Melt index |
|---|---|
| 6–9 | 1.5 |
| 9–12 | 1.7 |
| 12–15 | 1.8 |
| 15–18 | 1.8 |
| 18–21 | 1.6 |

As shown in Table V, the process stability of polypropylene was markedly improved by the practice of the present invention as indicated by the stable melt index of the polymer formed by copolymerization of propylene and an unsubstituted omega alkenyl silane.

EXAMPLE 7

To illustrate the improvement of $C_3+$ alpha olefin polymerization, pentene-1 monomer was copolymerized with a mixture of allyl chlorosilanes, the mixture containing allyl trichloro, diallyl dichloro and triallyl monochlorosilanes. Polymerization was effected by contacting 64 grams of pentene-1 and 5 grams of silane mixture at a temperature of 80° C. for a period of 1 hour in the presence of 870 grams of xylene diluent. Catalyst formed by the reduction of $TiCl_4$ with Al was employed in the reaction zone activated with 2 moles of $AlEt_3$ per mole of Ti at a concentration of about 1 g./liter.

The resulting polymer contained about 0.7 wt. percent silane and 99.3 wt. percent pentene-1. In contrast to a homopolymer of pentene-1 formed by the same polymerization process and which is amorphous and cannot be cured with a sulfur cure, the copolymer of pentene-1 and the mixed allyl chlorosilanes of this invention, when compounded in the manner indicated in Table VI, was cured to give a vulcanizate having the indicated properties.

*Table VI*

Composition:
| | |
|---|---|
| Polymer | [1] 28.0 |
| Philblack O | [1] 7.0 |
| Sulfur | [1] 0.28 |
| Sulfur acid | [1] 0.56 |
| Trimeme base | [1] 0.35 |

Physical properties (cured 1 hour at 260° C.):
    Tensile strength, 700 p.s.i.
    Insoluble in boiling n-heptane.

[1] Milled at 150° C.

As is thus illustrated, incorporation of minor quantities of reactive unsubstituted omega alkenyl silanes gives alpha olefin polymers of greatly improved utility. The above polymer of pentene-1 and mixed allyl chloro silanes can readily be employed as elastomer.

EXAMPLE 8

A polymerization reaction carried out as described in Example 1 was quenched with 50 ml. monoethanolamine and after stirring for 30 minutes, the polymer was precipitated with 1 liter of methanol and washed twice with 1 liter portions of methanol. After drying in vacuo, this polymer was readily dyed with basic dyes such as Genacryl Yellow R (product of General Dyestuffs Company, General Aniline and Film Corporation).

Copolymers quenched with methanol, and homopolymers of propylene were not dyed under similar conditions.

This illustrates that the polymers of the present invention may show increased dyeability as compared with conventional alpha olefin polymers.

Various modifications may be made to the present invention. For example, with respect to Example 8, a large number of difunctional compounds may be substituted for monoethanolamine, as a means of improving dyeability. These include tetramethyl ammonium hydroxide, catechol, hydroxylamine hydrochloride, hydroxybenzene sulfonic acids, etc. The present polymers may be compounded with various fillers and pigments, as well as blended with other polymers.

Having described the present invention, that which is sought to be protected is set forth in the following claims.

What is claimed is:

1. A process for preparing improved polymers which comprises reacting 0.1 to 35 weight percent of a $C_3$ to $C_{10}$ omega alkenyl trihalosilane compound and 99.9 to 65 weight percent of a $C_2$ to $C_{15}$ hydrocarbon aliphatic mono alpha olefin, at a temperature of 0° to 150° C. in the presence of a catalyst comprising a reducible heavy transition metal compound of a transition metal of Groups IV to VIII of the Periodic System and a reducing metal hydrocarbon compound of a metal of Groups I to III.

2. The process of claim 1 wherein the catalyst comprises a titanium halide and a trialkyl aluminum.

3. The process of claim 2 wherein the halogen of the silane compound is chlorine.

4. The process of claim 3 wherein the trihalo silicon compound is allyl trichlorosilane.

5. The process of claim 4 wherein the alpha olefin is propylene.

6. The product of claim 1.

References Cited by the Examiner

UNITED STATES PATENTS

| | | | |
|---|---|---|---|
| 2,448,391 | 8/1948 | Pyle | 260—80 |
| 2,532,583 | 12/1950 | Tyran | 260—80 |
| 2,909,511 | 10/1959 | Thomas | 260—88.1 |
| 2,954,367 | 9/1960 | Vandenberg | 260—88.1 |
| 3,037,005 | 5/1962 | Cooper et al. | 260—80 |

FOREIGN PATENTS 1,217,343  12/1959  France.

OTHER REFERENCES

Gaylord et al.: Linear and Stereoregular Addition Polymers, 1959, pages 99–100.

JOSEPH L. SCHOFER, *Primary Examiner.*

H. N. BURNSTEIN, *Examiner.*